March 22, 1927.
J. F. HAWORTH
1,622,110
CABLE OR WIRE CLAMP
Filed Nov. 1, 1926
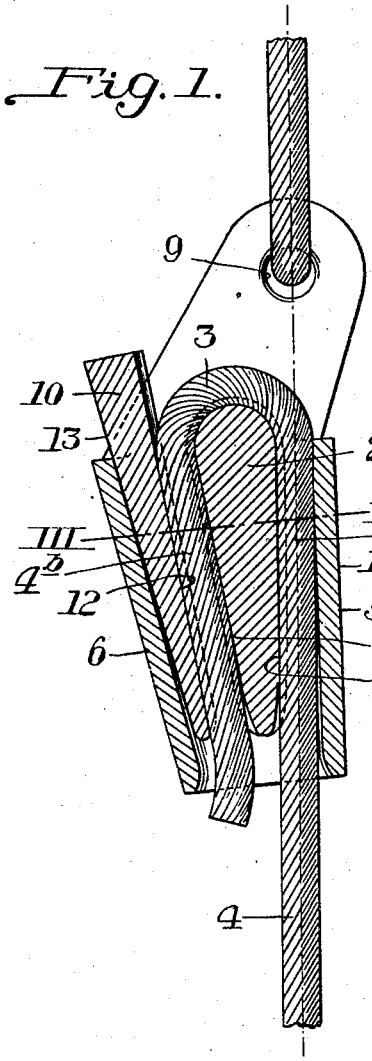
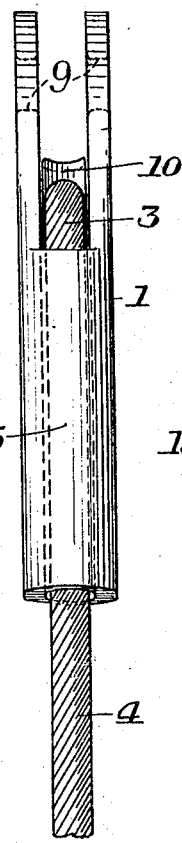
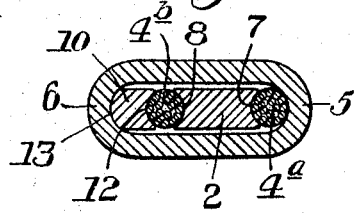
INVENTOR
John Frederic Haworth
by Byrnes, Stebbins & Parmelee,
his attorneys Patented Mar. 22, 1927.

1,622,110

UNITED STATES PATENT OFFICE.

JEHU FREDERIC HAWORTH, OF EDGEWORTH, PENNSYLVANIA.

CABLE OR WIRE CLAMP.

Application filed November 1, 1926. Serial No. 145,673.

The present invention relates to cable clamps and more particularly to cable or wire clamps of the type wherein the cable or wire is held in a clamp housing by means of a wedge. In this type of cable clamp the gripping engagement of the wedge on the cable or wire is usually secured by the tension of the cable or wire tending to draw the wedge into a tapered socket in the housing. An example of a clamp of this general type is shown in my Patent No. 1,380,800 of June 7, 1921. The final seating of the wedge in this type of clamp is usually accomplished by the heavy tension applied to the cable or wire, which results in a slight seating or sliding movement of the wedge in the housing, which in turn results in a slight movement being given to the tensioned cable or wire which may result in the formation of a certain amount of slack. The object of the present invention is to eliminate so far as possible the seating movement of the wedge in the housing and to permit the final gripping pressure to be applied without the necessity of drawing the cable or wire under tension. This is preferably accomplished by means of a second wedge which is forcibly driven into the clamp housing to cooperate with the first wedge in applying the gripping pressure to the cable or wire.

In the drawings:

Fig. 1 is a longitudinal central section through a cable clamp embodying my invention, showing a cable held therein;

Fig. 2 is a side elevation of the clamp; and

Fig. 3 is a cross-section taken on the line III—III of Fig. 1.

For simplicity, the invention will be described with particular reference to a cable clamp of the usual type, in which the end of the cable embraces a single wedge held in a tapered housing. While a cable of the wire rope type, which is made up of a plurality of separate wires, is illustrated as being held in the clamp, it will be obvious that a cable composed of a single wire or a cable of material other than metal might be held.

The cable clamp comprises a housing 1 within which is disposed a wedge 2 which is embraced by a loop 3 of the cable 4. The housing has a tapered socket formed by the converging sides 5 and 6. The sides 5 and 6 are interiorly curved or channeled to fit the cable and wedges as shown in Fig. 3. The wedge 2 has similarly recessed sides 7 and 8 for fitting against the cable loop. The side 5 of the tapered socket which holds the tensioned leg 4$^a$ of the loop is parallel to the direction of pull on the cable. The eyes 9 which receive another cable or hook are located on opposite sides of the center line of the tensioned leg 4$^a$ so that there is a direct pull on the cable without bending its tensioned part.

A second wedge 10 is arranged to be forcibly driven into the housing to grip the free or untensioned leg 4$^b$ of the loop and to force the wedge 2 over into tight gripping engagement with the tensioned leg 4$^a$. The wedge 10 has an inwardly recessed side 12 conforming to the cable and an outwardly curved side 13 fitting against the side wall 6 of the housing.

When the clamp is to be applied, the cable is looped around the wedge 2 which is positioned in the housing. Then the wedge 10 is forcibly driven into the open larger end of the tapered socket with sufficient force to apply the desired grip to the cable. Both wedges 2 and 10 are tapered in the same direction as the taper of the socket so that tension on the cable will tend to draw the wedges into even firmer gripping engagement with the cable. The wedge 2, with its embracing cable loop, may be given its final position in the housing and all slack taken out of the cable, and then the wedge 10 may be forcibly driven in to apply clamping pressure to the cable. After this is done there is little, if any, seating movement of the wedge 2 and cable in the clamp when the cable is afterward put under tension.

While the preferred embodiment of the invention has been specifically illustrated and described, it is understood that the invention is not limited to its illustrated embodiment, but may be otherwise embodied within the scope of the following claims.

I claim:

1. A cable or wire clamp comprising a housing having a tapered socket for receiving a loop of cable or wire, a wedge in the socket and within the loop of the cable or wire for frictionally clamping the tensioned leg of the loop against one side of the socket, and a second wedge adapted to be forced into the socket into gripping engagement with the other leg of the loop.

2. A cable or wire clamp comprising a housing having a tapered socket for receiving a loop of the cable or wire, a wedge in the socket tapered in the same direction as the socket and within the loop of the cable or wire for frictionally clamping the tensioned leg of the loop against one side of the socket, and a second wedge tapered in the same direction as the first wedge and adapted to be forced into the larger end of the socket and into gripping engagement with the other leg of the loop.

3. A cable or wire clamp comprising a housing having a tapered socket for receiving a loop of the cable or wire, a wedge in the socket for frictionally clamping the tensioned leg of the loop against one side of the socket, and a second wedge adapted to be forced into the socket into gripping engagement with the other leg of the loop.

4. A cable or wire clamp comprising a housing having a tapered socket for receiving a loop of the cable or wire, a wedge in the socket and adapted to be embraced by the loop of the cable or wire for frictionally clamping the tensioned leg of the loop, and a second wedge adapted to be forced into the socket into gripping engagement with the other leg of the loop.

5. A cable or wire clamp comprising a housing having a tapered socket for receiving a loop of cable or wire, a wedge in the socket for frictionally clamping a leg of the loop against one side of the socket, and a second wedge adapted to be forced into the socket to maintain the first mentioned wedge in gripping engagement with the cable or wire.

6. A cable or wire clamp comprising a housing having a socket for receiving a portion of a cable or wire, a wedge in the socket for frictionally clamping the cable or wire against one side of the socket, and a second wedge adapted to be forced into the socket in the same direction as the first mentioned wedge to maintain it in gripping engagement with the cable or wire.

7. A cable or wire clamp comprising a housing having a tapered socket for receiving a portion of a cable or wire, and a plurality of wedges in the socket and cooperating therewith for frictionally clamping the cable or wire.

In testimony whereof I have hereunto set my hand.

JEHU FREDERIC HAWORTH.